United States Patent
Previti et al.

[11] 3,713,974
[45] Jan. 30, 1973

[54] NUCLEAR REACTOR FUEL ELEMENTS

[76] Inventors: Giuseppe Previti, Corso Francia 62; Paolo Roncarolo, Via Carlo Vidua 24, both of Turin, Italy

[22] Filed: Dec. 10, 1969

[21] Appl. No.: 883,721

[30] Foreign Application Priority Data

Dec. 20, 1968   Italy..................54393 A/68

[52] U.S. Cl......................................176/78, 176/76
[51] Int. Cl. .................................................G21c 3/34
[58] Field of Search...................176/76, 78, 83, 87

[56] References Cited

UNITED STATES PATENTS

| | | | |
|---|---|---|---|
| 3,356,587 | 12/1967 | Heck | 176/78 |
| 3,368,945 | 2/1968 | Keller et al. | 176/78 X |
| 3,475,273 | 10/1969 | Krawiec | 176/78 |
| 3,105,807 | 10/1963 | Blake | 176/75 X |
| 2,994,657 | 8/1961 | Petrick | 176/78 X |

Primary Examiner—Carl D. Quarforth
Assistant Examiner—Gary G. Solyst
Attorney—Sughrue, Rothwell, Mion, Zinn & Macpeak

[57] ABSTRACT

A nuclear reactor fuel element has a number of fuel rods arranged in a metallic sheath, the rods being spaced by a number of axially spaced apart grids. Some grids are fixed relative to the sheath while others can slide axially therein, and each fuel rod is frictionally connected to all the slidable grids but to some only of the fixed grids, said fuel rod passing freely through the other fixed grids. The fixed and slidable grids alternate in the central part of the fuel element, and in consequence the loading of the sheath as a result of differential thermal expansion is minimized.

9 Claims, 12 Drawing Figures

NUCLEAR REACTOR FUEL ELEMENTS

This invention relates to fuel elements for nuclear reactors.

More particularly the invention has reference to nuclear reactor fuel elements formed from a plurality of fuel rods arranged parallel to each other, and including means for spacing and stabilizing the rods in the form of a plurality of transverse grids, and elastic connecting means between the rods and the transverse grids and an external metal sheath acting as a support for the fuel element structure.

Fuel elements for nuclear reactors have a high working temperature; therefore the problem arises of eliminating stresses in the structure of a fuel element arising from thermal expansion of the materials from which it is formed. This is particularly important for fuel elements having an external support sheath made from stainless steel, with fuel rods which contain the fissile material in the form of a zirconium alloy: as the coefficients of thermal expansion of these two materials are in the ratio of 3 to 1 to each other, the sheath is subjected, at its working temperature, to an axial compression load.

This happens because thermal stresses are transmitted by the fuel rods to the spacing and stabilizing grids by means of the elastic connections therebetween and by friction, and from the grids to the sheath, to which the grids are usually welded or rigidly connected in some other way.

Such thermally induced compression loads acting on the fuel element sheath can, at the sheath working temperature, be appreciable and such as to cause, if not total collapse of the fuel element structure under extreme load, then phenomena of local instability in the sheath.

It should be remembered that the metal forming the sheath is generally not in the form of continuous sheet metal, but is sufficiently perforated to allow the circulation of coolant fluid. The sheath is therefore weakened, to the detriment of local stability. Such instability effects, together with interaction forces acting on the connecting means between the grids and the outside sheath, can cause the breaking of said connecting elements, whether they comprise welded seams, riveting or any other element of rigid connection.

Fuel elements formed with an external sheath surrounding spacing grids and by a plurality of fuel rods having various coefficients of thermal expansion, can be realized by strengthening the carrying structure and the connecting means. This procedure, however, apart from leading to an increased cost of the fuel element structure and of their means of support, also causes a reduction of efficiency of the nuclear reactor.

In fact the reactivity of a nuclear reactor, and therefore the power generated thereby, is limited by the quantity of absorber or parasite material present in the core of the reactor. Such material not only absorbs neutrons, which would be otherwise utilized in the fission, but has a negative influence on the thermal exchange inside the reactor core.

An object of this invention is to reduce the stresses acting on the structure of a fuel element of the aforesaid type to such values as not to jeopardize the integrity and the functioning of the fuel element itself or its component parts.

Another object of the invention is to provide a high structural security in fuel elements of the kind already known and used, without the penalty of a significant increase in weight, with reference to the total weight of the structure, and without modification of the components which form the fuel element.

A further object of this invention is to provide for improved heat exchange between the fuel element and a coolant fluid by providing in the fuel element suitable promoters of turbulent flow which improve the capacity for extracting useful power from the fuel element.

This invention fulfils the above mentioned objects because the respective connections between the fuel rods and the grids and between the grids and the external sheath are respectively made and arranged in such a way to reduce to a minimum the stresses arising at the working temperature of the fuel element due to the different thermal expansions of the different materials cooperating in the fuel element structure. Such connections are moreover able to confer adequate lateral stability to the grids and to produce a transverse circulation or vortex flow in the ascending current of coolant fluid in operation of the fuel element to thereby improve the thermal exchange between the fuel element and the coolant fluid.

These and other objects and advantages of this invention will become more apparent when considered in the light of the following detailed description of the accompanying drawings which show one embodiment of the invention by way of example, and in which.

Figures 1, 12:
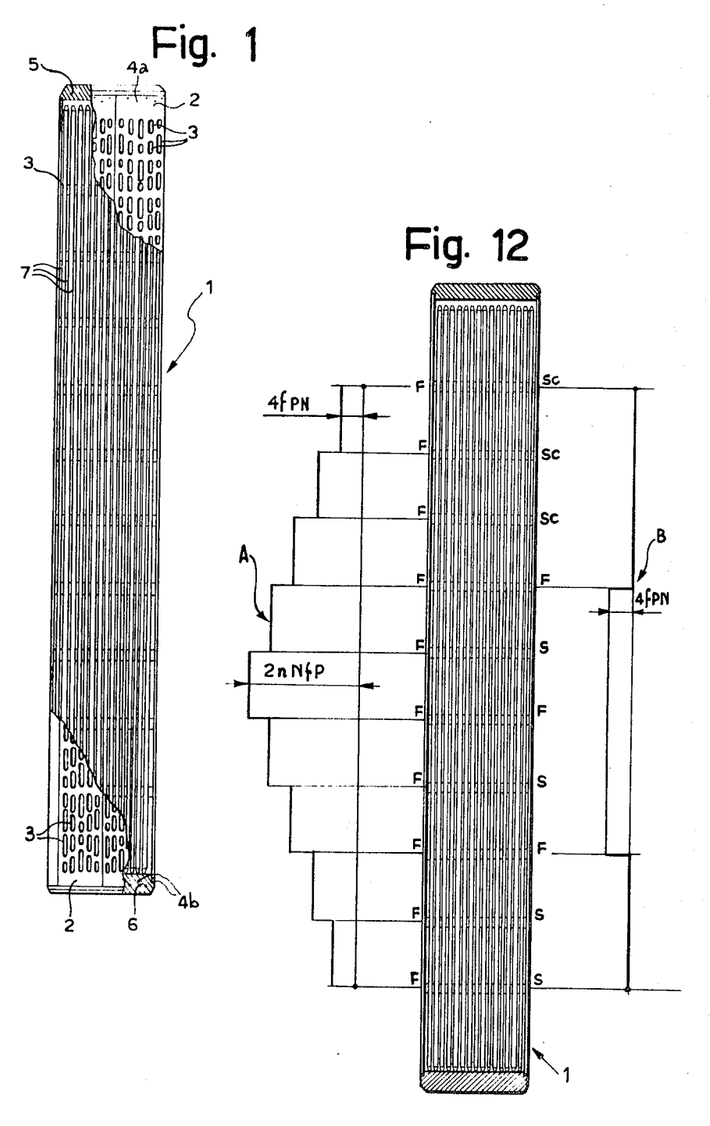
FIG. 1 is a schematic view in elevation of a fuel element according to said embodiment of the invention, shown partially in section and with parts cut away for clarity.
FIG. 12 illustrates diagrammatically a comparison between the distribution of the forces of compression along the axis of a fuel element according to the invention and the distribution of these forces in a fuel element according to the prior art.

FIG. 1 shows a fuel element indicated generally at 1, which includes an external sheath 2 of stainless steel, provided with holes 3 for the through passage of a coolant liquid. The sheath 2 is connected by riveting 4a and 4b at opposite respective ends to a lid 5 and to a base 6 respectively.

Inside the sheath 2 a plurality of zirconium alloy fuel rods 7 (FIG. 3) is lodged, the rods 7 resting on the base 6 and being maintained with their axes parallel to the axis of the fuel element 1 by a plurality of grids 8, 9 (FIGS. 2 and 8) arranged in planes normal to the axis of the fuel element 1. The grids 8 are mounted for limited axial sliding movement along the axis of the fuel element 1 and are hereafter referred to as "slidable grids," while the grids 9, hereafter referred to as "fixed grids," are rigidly connected to the external sheath 2.

Figure 2:
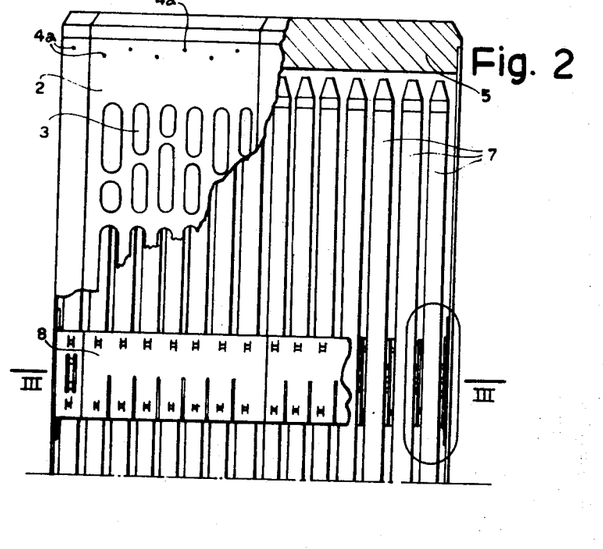
FIG. 2 is a view in elevation, on an enlarged scale relative to that of FIG. 1, of the upper part of the fuel element, again partially in section and with parts cut away for clarity.
Figure 3:
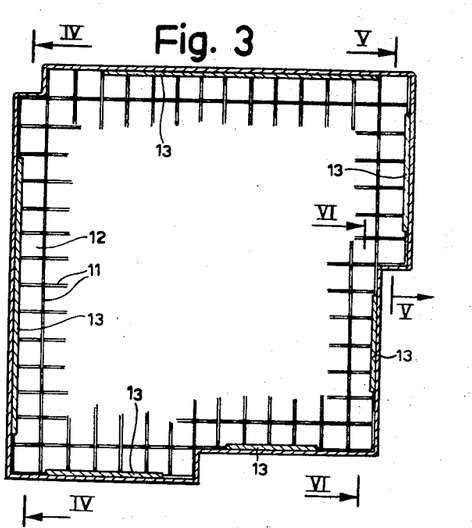
FIG. 3 is a transverse cross-section on the line III—III of FIG. 2, the central part of the section being omitted for the sake of avoiding undue repetition.
Figure 8:
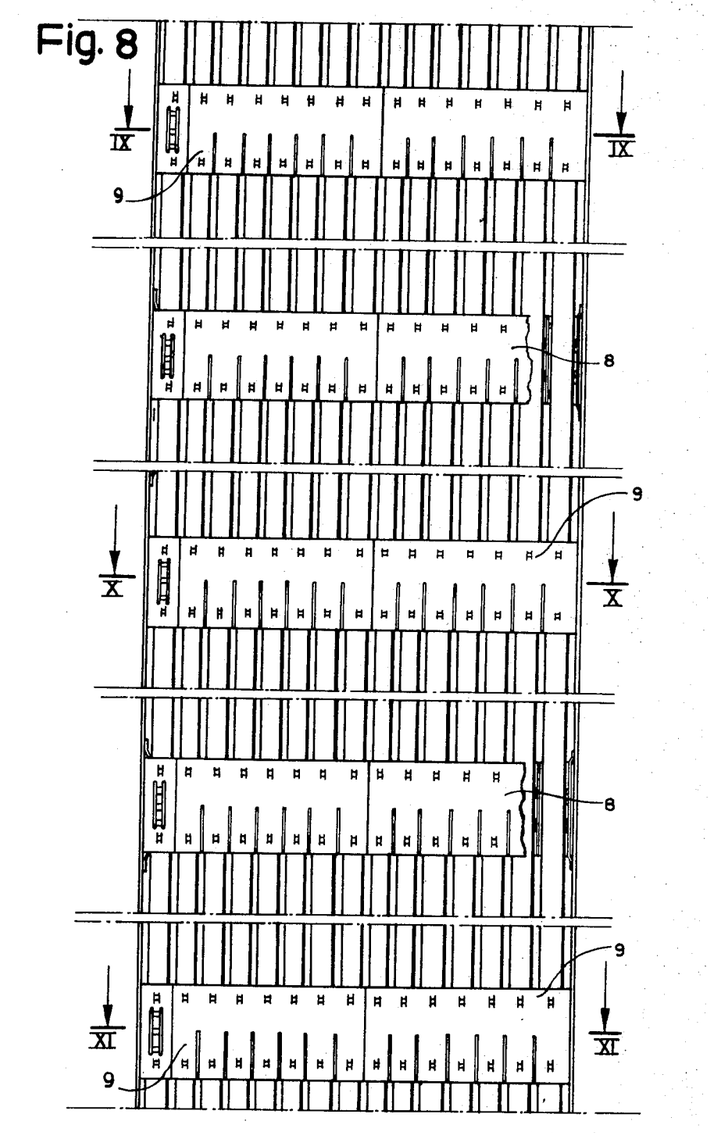
FIG. 8 is a view in elevation of the central part of the fuel element, shown partially in section and with parts cut away for clarity.

Each of the grids 8 and 9 comprises a laminar outer peripheral wall 10 and laminar internal walls 11 attached to the outer wall 10 and intersecting one another at 90°, the internal walls 11 being welded together at their intersections so as to form a plurality of identical cells 12 of rectangular cross section.

Each slidable grid 8 is connected to the external sheath 2 by interposing the laminar peripheral wall 10 of the grid 8 between the external sheath 2 and a plurality of metallic comb-shaped strips indicated generally at 13. The combshaped strips 13, which extend parallel to the laminar wall 10, are placed in correspondence with the central straight portions of the contour of each wall 10 and have a smaller length than these straight portions.

Each metallic strip 13 comprises a continuous flange 14 extending normal to the axis of the element 1 and in contact with the internal surface of the sheath 2. The flange 14 carries rectangular elongated fillets 15 extending parallel to the axis of the element 1 and spaced from the sheath 2. The fillets 15 have their free ends, opposite the continuous flange 14, shaped to form respective flanges 16 in contact with the internal surface of the sheath 2.

Figure 4:
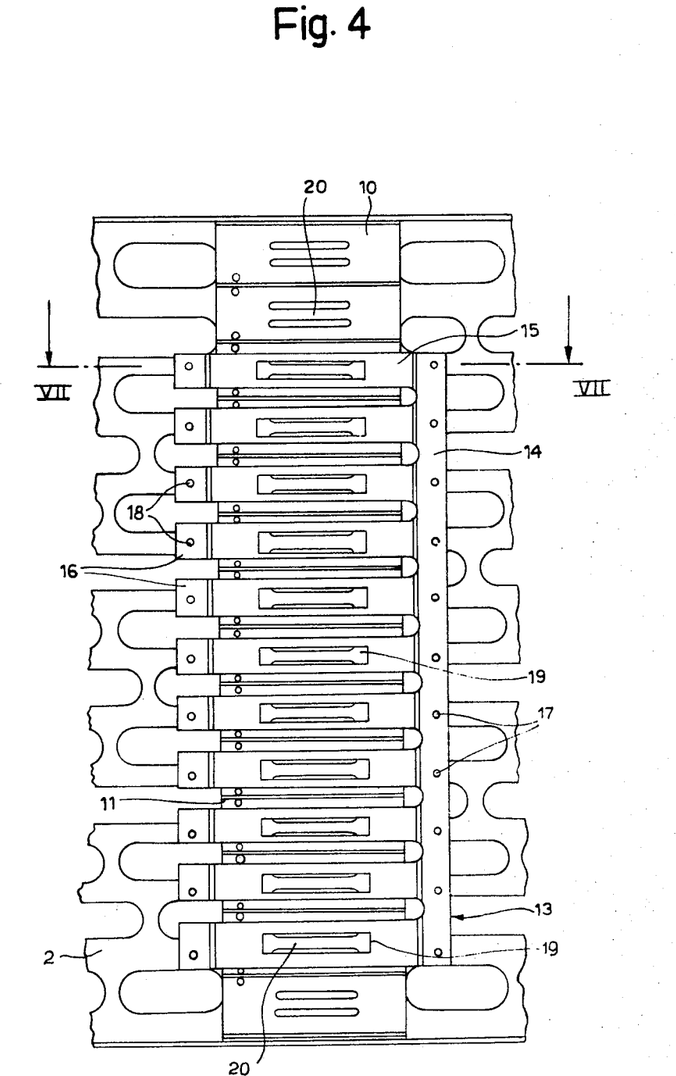
FIG. 4 is a partial axial section on the line IV—IV of FIG. 3.
Figure 7:
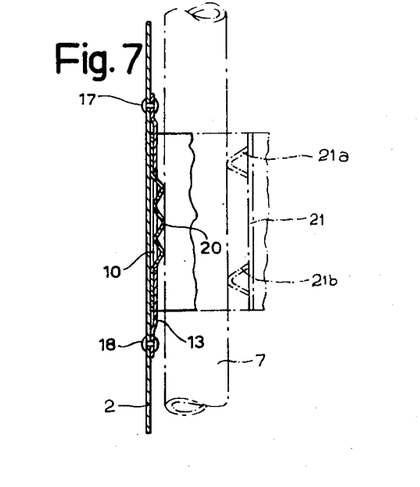
FIG. 7 is a diagrammatic partial cross-section on line VII—VII of FIG. 4.

Respective rows of welding points or of rivets 17 and 18 connect rigidly the flange 14 and the end flanges 16 respectively of the metal comb-shaped strip 13, to the external sheath 2 (see FIGS. 4 and 7). In the metallic strip 13 the length of the raised part of each fillet 15 which is spaced from the sheath 2 is greater than the width of the grid wall 10 in the direction of the axis of the element 1.

In FIG. 4 each rectangular fillet 15 is formed in its raised part with a central rectangular opening 19, elongated in the direction of the length of the fillet 15, to allow the passage of spring elements 20 formed by cutting or stamping the laminar wall 10.

Each fuel rod 7 makes frictional contact with each laminar wall 11 of each slidable grid 8 by means of two spring elements 20 formed on two adjacent walls of the respective cell 12 and by means of rigid supports 21, each provided with two projections 21a and 21b, formed on the opposite respective walls of the cell 12, as shown in broken outline in FIG. 7.

Figure 5:
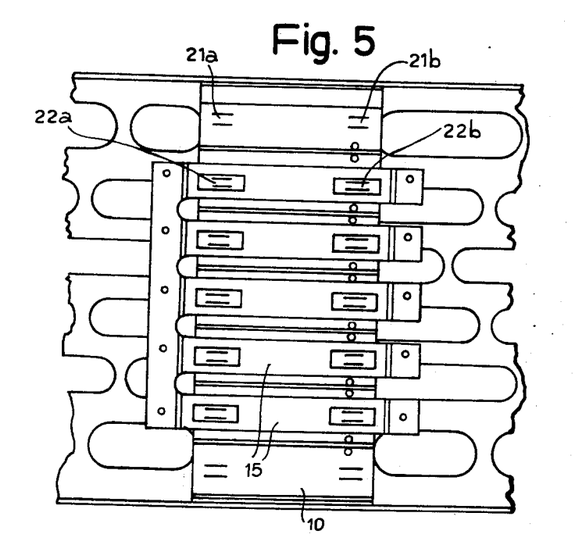
FIG. 5 is a partial axial section on the line V—V of FIG. 3.
Figure 6:
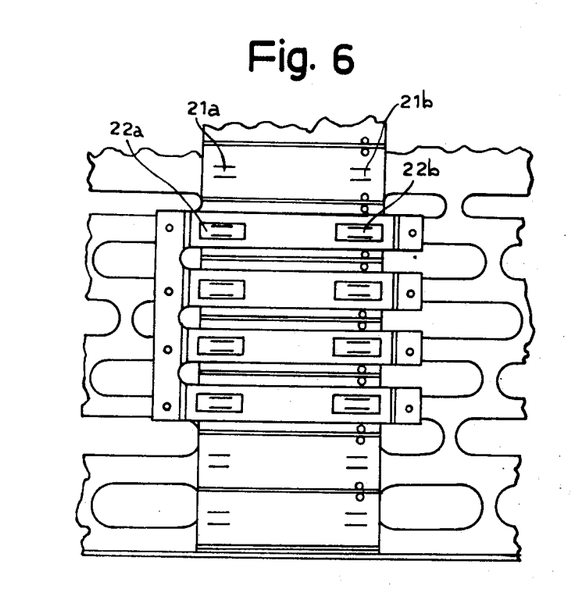
FIG. 6 is a partial axial section on the line VI—VI of FIG. 3.

When such supports 21 are formed on the laminar peripheral wall 10 of the grid 8, as in FIGS. 5 and 6, the fillets 15 are formed, near the respective flanges 14 and 16, with two rectangular openings 22a and 22b respectively which allow the entry of the respective projections 21a and 21b. In this way, it is ensured that, should the strip 13 become detached from the sheath 2 as a result of breaking of the connections (welding points or rivets 17, 18) with the sheath 2, the strip 13 will not become detached from and lose its position relative to the grid 8.

In each fixed grid 9 only selected fuel rods 7a are connected by friction through the spring elements 20 and the rigid supports 21 to the walls of respective cells 12 while the remaining fuel rods 7 are not connected in any way to the grids 9. Each fuel rod 7 is, however, connected to one only of the fixed grids 9. By comparing FIGS. 9, 10 and 11, it can be seen that the fuel rods 7a connected to any one fixed grid 9 pass freely through the other fixed grids. Moreover, it will be observed that the fuel rods 7a connected to each grid 9 are symmetrically disposed about the axis of the fuel element 1.

The fixed grids 9 of the fuel element 1 illustrated are three in number and are placed in the central part of the fuel element. One of the sliding grids 8 is interposed between each adjacent pair of fixed grids.

Figure 9:
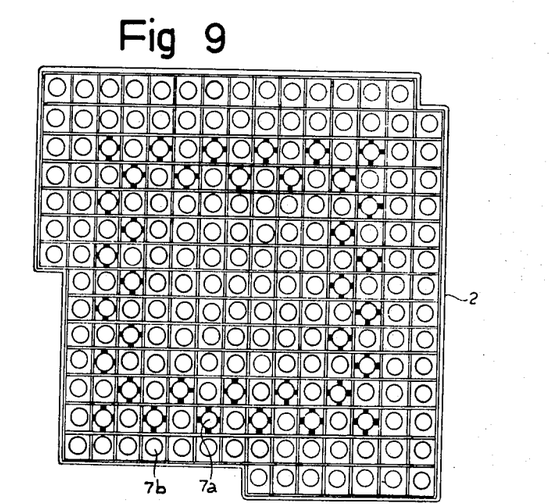
FIG. 9 is a transverse cross-section on the line IX—IX of FIG. 8.
Figure 10:
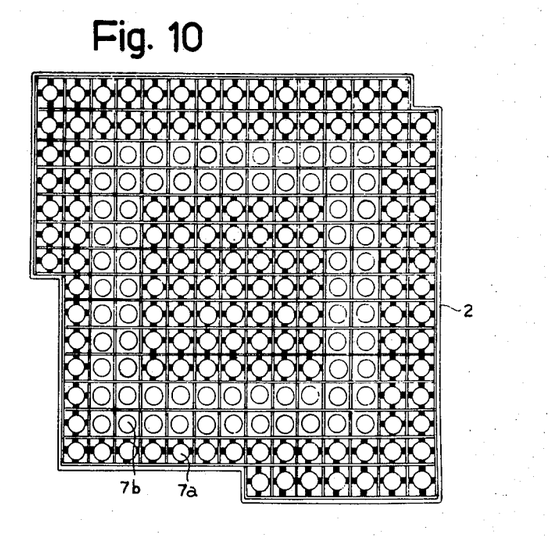
FIG. 10 is a transverse cross-section on the line X—X of FIG. 8.
Figure 11:
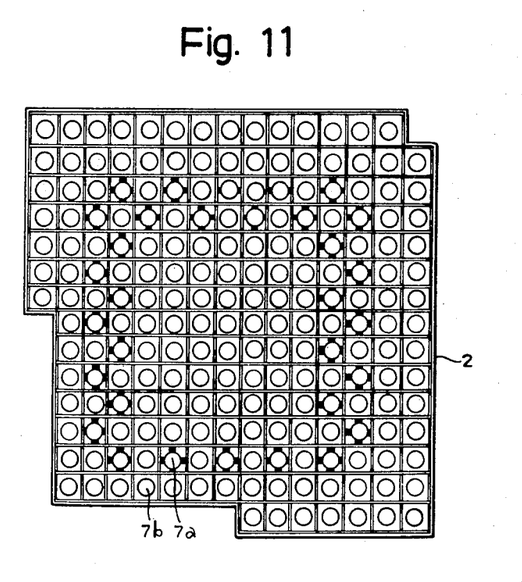
FIG. 11 is a transverse cross-section on the line XI—XI of FIG. 8.

It will be further noticed from FIGS. 9, 10 and 11 that the number of fuel rods 7 connected by friction to the upper and lower fixed grids 9 is less than the number of fuel rods 7 connected by friction to the middle fixed grid 9 (FIG. 10).

The distribution of the compression forces transmitted to the external sheath 2 will now be considered.

According to known fuel element constructions the fuel rods were all connected by friction to each of the support grids, and the latter were all rigidly connected to the external sheath: the axial compression load transmitted by each grid to the external sheath is, therefore, in this case, given by:

$$4fPN$$

where:
4 is the number of contacts between each fuel rod and each grid cell;
$f$ is the coefficient of friction;
$N$ is the number of fuel rods, and
$P$ is the load on each spring element of the grid.

The distribution of the compression loads assumes, when represented diagrammatically (FIG. 12), a progression of steps, illustrated at A on the left-hand side of FIG. 12; the load reaches its peak value in the middle part of the fuel element 1 and is given by $$2nNfP$$

where $n$ is the total number of grids.

In FIG. 12, the values of the compression load are represented along an axis perpendicular to the axis of the fuel element 1.

It will be appreciated that, in tracing the diagram of FIG. 2 the weight of the structure has not been taken into account — that is, the load diagram has been drawn as if the axis of the fuel element 1 were horizontal.

In the fuel element of this invention, in which the connections between fuel rods 7 and grids 8, 9 and respectively between grids 8, 9 and external sheath 2 are arranged and formed in the way previously described, substantially no load is transmitted to the external sheath 2 from the grids 8, 9. Consequently, only the central part of the structure, which is included between the fixed grids 9 is compressed, and in this central part the compression load has a constant value, given by:

$$4fPN^1$$

where $N^1$ equals the number of fuel rods 7 connected by friction to the fixed upper and lower grids 9.

The diagram of the compression load distribution, therefore, has the form indicated at B on the right hand side of FIG. 12. In this case also the weight of the structure has not been taken into account.

As the relative coefficients of thermal expansion between the fuel rods and the spring elements and rigid supports of the grid cells are very high (about 0.4) because of the physical nature of zirconium, the loads of axial compression induced by thermal expansion would be considerable and preponderant in relation to the weight of the structure if the grids were rigidly connected to the external sheath, as in known fuel element constructions.

A further advantage of this invention lies in the fact that, by connecting by friction all fuel rods 7 to each sliding grid 8 and connecting only some of the rods 7 to each fixed grid 9, the space left free by the fuel rods 7 in the cells 11 freely traversed thereby is larger than it would be if all the rods 7 were connected by friction to all the grids, as in known fuel elements. From this it follows that the coolant liquid, which flows upwardly through the fuel element, passes preferentially through those cells which are freely traversed by fuel rods without any frictional contact, since the pressure required to force the liquid through these cells is less than in the case of cells to which the rods are frictionally connected.

Since such "low flow resistance" cells are displaced relative to each other at different levels in the fuel element 1, the coolant liquid is deflected transversely as it flows upwardly through the element. This results in a vortex flow of the coolant liquid and thus in a better thermal exchange between coolant liquid and the fuel rods.

To further improve the thermal exchange, the comb-shaped strips 13 placed in correspondence with the straight portions of the laminar walls of the contour of each sliding grid 8, are shorter in length than each said straight portion.

In fact as the grid cells at the corners of the fuel element are already restricted, because of the interconnections between the laminar walls forming the cells, it is thought that further restriction of the cross-section of the peripheral grid cells 11 due to presence of the comb-shaped strips 13 would have had an adverse effect on the cooling.

It will be understood that details of practical embodiments of the fuel element according to the invention can be amply varied with respect to what has been illustrated and described by way of example without departing from the scope of the appended claims.

We claim:

1. Nuclear reactor fuel element comprising in combination:
    a. a plurality of fuel rods arranged parallel to each other;
    b. a plurality of grids spacing and stabilizing the fuel rods;
    c. an external sheath enclosing the fuel rods;
    d. each of said grids being disposed parallel to and spaced from each other along the length of said rods with every other one of said grids being rigidly secured to said external sheath;
    e. grid connecting means frictionally connecting the remaining grids to said sheath for limited axial sliding movement relative to said sheath, and
    f. interconnecting means frictionally connecting each rod to one rigidly secured grid and to each of the remaining axially movable grids.

2. Fuel element according to claim 1, including means defining flow passages for coolant fluid between the fuel rods and the grids, the frictional interconnecting means between the fuel rods and the grids being so distributed along the length of the fuel element to cause transverse deflection of coolant fluid flowing along said flow passages whereby to enhance thermal exchange between the fuel rods and the coolant fluid.

3. Fuel element according to claim 3, wherein slidable grids are arranged at the opposite ends of the fuel element while the fixed grids are arranged in the central part of the fuel element, alternating with slidable grids.

4. Fuel element according to claim 3, wherein the fixed grids arranged in the central part of the fuel element are three in number.

5. Fuel element according to claim 4, wherein the guide means comprise axially extending fillets provided at opposite ends with flanges fixed to the inner surface of the external sheath, the part of each fillet between said flanges being spaced from the said inner surface of the sheath, and including laminar peripheral walls on each slidable grid interposed between the fillets and the external sheath and permitting relative axial sliding movement between the sheath and said grid.

6. Fuel element according to claim 6, further comprising a metallic comb-shaped strip, said fillets cooperating with each side of the sheath being formed as part of said respective metallic comb-shaped strip.

7. Fuel element according to claim 6, wherein each comb-shaped strip carrying the fillets adjacent each respective side of the sheath has a shorter length than that of the respective said side.

8. Fuel element according to claim 6, wherein the fillets of each comb-shaped strip are each formed with axially elongated openings and the laminar peripheral walls of each sliding grid are formed with spring elements which enter respective said elongated openings to support the grid from the strip.

9. Fuel element according to claim 1, wherein the fuel rods frictionally connected to each fixed grid are disposed symmetrically with respect to the axis of the fuel element.

* * * * *

UNITED STATES PATENT OFFICE
CERTIFICATE OF CORRECTION

Patent No. 3,713,974            Dated January 30, 1973

Inventor(s) Giuseppe Previti et al

It is certified that error appears in the above-identified patent and that said Letters Patent are hereby corrected as shown below:

In The Heading:

The Assignee's Name was omitted. Should read:

--Assignee: FIAT Societa per Azioni, Turin, Italy--

Signed and sealed this 3rd day of July 1973.

(SEAL)
Attest:

EDWARD M. FLETCHER, JR.          Rene Tegtmeyer
Attesting Officer                 Acting Commissioner of Patents